United States Patent [19]
Ehara

[11] Patent Number: 5,864,619
[45] Date of Patent: Jan. 26, 1999

[54] COMMUNICATIONS DEVICE EQUIPPED WITH WALL-MOUNT HOOK MECHANISM

[75] Inventor: Makoto Ehara, Tokyo, Japan

[73] Assignee: Uniden Corporation, Tokyo, Japan

[21] Appl. No.: 819,183

[22] Filed: Mar. 17, 1997

[30] Foreign Application Priority Data

Oct. 11, 1996 [JP] Japan ................................. 8-269941

[51] Int. Cl.⁶ ....................................................... H04M 1/00
[52] U.S. Cl. ............................................ 379/435; 379/436
[58] Field of Search .................................... 379/428, 435, 379/436, 454, 420

[56] References Cited

FOREIGN PATENT DOCUMENTS

| 55-166367 | 12/1980 | Japan . |
|---|---|---|
| 58-14651 | 1/1983 | Japan . |
| 60-160759 | 8/1985 | Japan . |
| 61-107255 | 7/1986 | Japan . |
| 1-231551 | 9/1989 | Japan . |
| 2-75852 | 6/1990 | Japan . |
| 4-108245 | 4/1992 | Japan . |
| 5-4656 | 1/1993 | Japan . |
| 7-33474 | 7/1995 | Japan . |

Primary Examiner—Jack Chiang
Attorney, Agent, or Firm—McDermott, Will & Emery

[57] ABSTRACT

The present invention provides a telephone which can be reliably switched from a tabletop usage state to a wall-mount usage state by a simple operation. This telephone is equipped with a hook that protrudes when the telephone is mounted on a wall, and fits into a concave component provided to the handset. The hook is constructed such that it is able to slide, and does not protrude when the telephone is used on a tabletop. The hook is equipped with a locking mechanism on the inside, and the weight of the handset will not cause the hook to go down accidentally.

10 Claims, 10 Drawing Sheets

FIG.5d
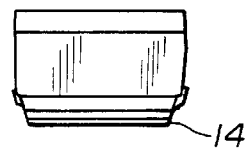
FIG.5b  FIG.5a  FIG.5e  FIG.5c
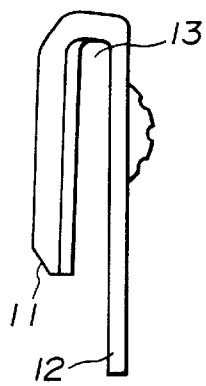 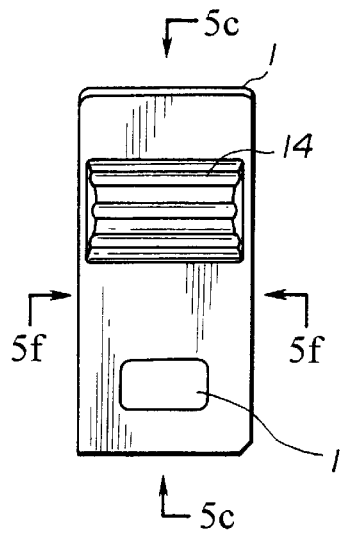 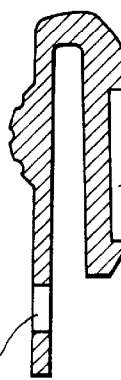 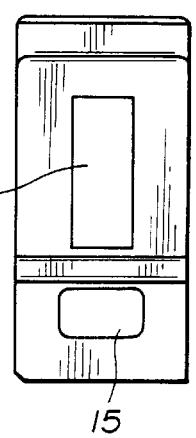
FIG.5f
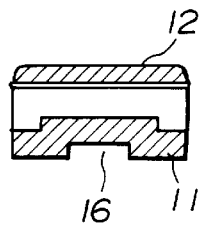

CROSS SECTION
ALONG 7-7 LINE

CROSS SECTION ALONG 8-8 LINE

COMMUNICATIONS DEVICE EQUIPPED WITH WALL-MOUNT HOOK MECHANISM

BACKGROUND OF THE INVENTION

1. Field of the Invention

The present invention relates to a communications device that can be used both in tabletop and wall-mount applications.

2. Description of the Related Art

Telephones, facsimile machines, and other such communications devices are widely used in the home and office, and are used under many different conditions. This type of communications device is sometimes placed on a desk and sometimes fixed to a wall. It is preferable for a communications device to be adaptable to any of these conditions. Prior art aimed at this goal included the following devices.

In Japanese Patent Publication 58-9629 is discussed a handset holding mechanism equipped with a movable plunger and constructed such that the plunger can be pulled out when the device is mounted on the wall. However, since springs and balls were used, the structure was complicated and reliable operation was less than certain.

In Japanese Laid-Open Patent Application 60-160759 is discussed a telephone that is equipped with a slidable handset cradle in which the handset is supported on a protrusion on the handset cradle when mounted on the wall. However, since the movement of the handset cradle was limited by just one protrusion, there was the danger that the handset cradle would be moved by a fairly large force and the handset would be jarred loose.

In Japanese Patent Publication 63-4741 is discussed an intercom device that is equipped with a movable hanger member, in which the handset is supported by making the hanger member protrude outward when the device is mounted on the wall, but this hanger member had to be rotated with a screw driver in order to vary the state of the hanger member, which was inconvenient. It would be preferable if there were a mechanism that was simple to operate and required no tools.

In Japanese Laid-Open Patent Application 1-231551 is discussed a structure that is equipped with a fan-shaped tab that is rotatably constructed, in which the handset is supported by making the tab protrude outward when the device is mounted on the wall, but the problem was that the construction was bulky and the structure complicated.

In Japanese Laid-Open Patent Application 4-108245 is discussed a hanger mechanism that is equipped with a slidable protrusion, in which the receiver is supported by the protrusion when the device is mounted on the wall, but the movement of the protrusion was limited only by a sheet spring, and the problem was that undesirable movement could result from the application of a fairly large force, or it could be difficult to pull out the recessed protrusion when the device was set up for tabletop use.

In Japanese Laid-Open Utility Model Application 2-75852 is discussed a telephone in which the hook is set to a protruding state when the telephone is mounted on the wall, but since the state of the hook was switched with a rotary button, a screw driver or another such tool was required and the button was not easy to operate.

In Japanese Laid-Open Utility Model Application 5-4656 and Japanese Utility Model Publication 7-33474 is discussed a wall-mount hook, but when the device was switched from tabletop to wall-mount use, the hook first had to be removed and turned over, so the operation was cumbersome, and there was also the danger that the user would lose the hook. There was also the danger that the user would stick the hook in backwards.

As discussed above, the problem with prior art was that the operation was complicated, or the structure was complex, or there was the danger that the user would lose the parts.

SUMMARY OF THE INVENTION

The present invention was conceived in an effort to solve the above problems, and an object thereof is to provide a communications device with which a telephone can be effectively switched from a tabletop usage state to a wall-mount usage state by a simple operation, there is no danger of this state changing accidentally, and there is no danger of the user losing the parts.

The present invention is a communications device that is equipped with a wall-mount hook mechanism comprising [i] a hook member that has a first engagement component and a second engagement component on a first surface and a second surface, respectively, and [ii] a support mechanism that has a third engagement component and a fourth engagement component which engage with the first engagement component and the second engagement component, respectively, and that movably supports the hook member so that either a protruding or non-protruding state can be selected, with which the hook member is able to engage with a concave component provided to a communications-use handset when the hook member is in its protruding state; characterized by the fact that the first engagement component and the third engagement component are engaged when the hook member is in its protruding state, the movement of the hook member is limited by the contact between the end of the second surface and the fourth engagement component, and the second engagement component and the fourth engagement component are engaged when the hook member is in its non-protruding state.

For example, the first surface corresponds to the first portion 11 discussed below, the second surface corresponds to the second portion 12 discussed below, the first engagement component corresponds to the concave component 16 discussed below, the second engagement component corresponds to the through hole 15 discussed below, the hook member corresponds to the hook 1 discussed below, the third engagement component corresponds to the hook retainer tab 21 discussed below, the fourth engagement component corresponds to the convex component 23 discussed below, and the support mechanism corresponds to the hook housing component 4 discussed below.

The cross sectional shape of the hook member may be roughly U-shaped, roughly rectangular, or roughly trapezoidal. The first engagement component and second engagement component may be provided to facing planes of the hook member, or may be provided to intersecting planes. The third engagement component and fourth engagement component should be able to engage with the first engagement component and second engagement component, respectively. The relationship when engaged is discretionary. For example, the first engagement component may be the concave component and the third engagement component the convex component, or it may be the other way around.

With the present invention, the hook member has an exposed operation component, and when this operation component is pressed down it releases the contact between the second engagement component and the fourth engagement component and eliminates the restriction of the movement of the hook member. When this restriction of movement is eliminated, the hook member can be switched from its protruding state to its non-protruding state.

BRIEF DESCRIPTION OF THE DRAWINGS

FIGS. 5a, 5b, 5c, 5d, 5e and 5f shows the details of the hook 1 in Embodiment 1 of the present invention;

DESCRIPTION OF THE PREFERRED EMBODIMENTS

The telephone in Embodiment 1 of the present invention is a dual-purpose type of telephone that can be applied to both tabletop and wall-mount usage. The telephone of Embodiment 1 of the present invention will now be described through reference to the figures.

Figure 1:
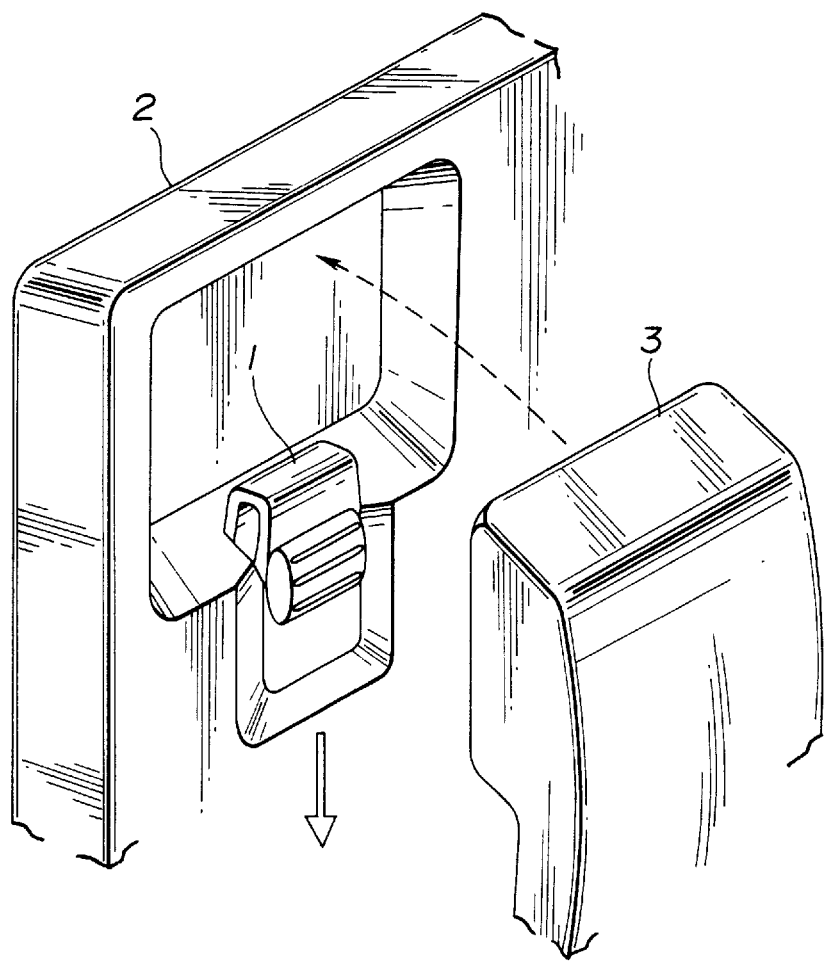
FIG. 1 illustrates the state when the telephone in Embodiment 1 of the present invention is set for wall-mount usage.
Figure 4:
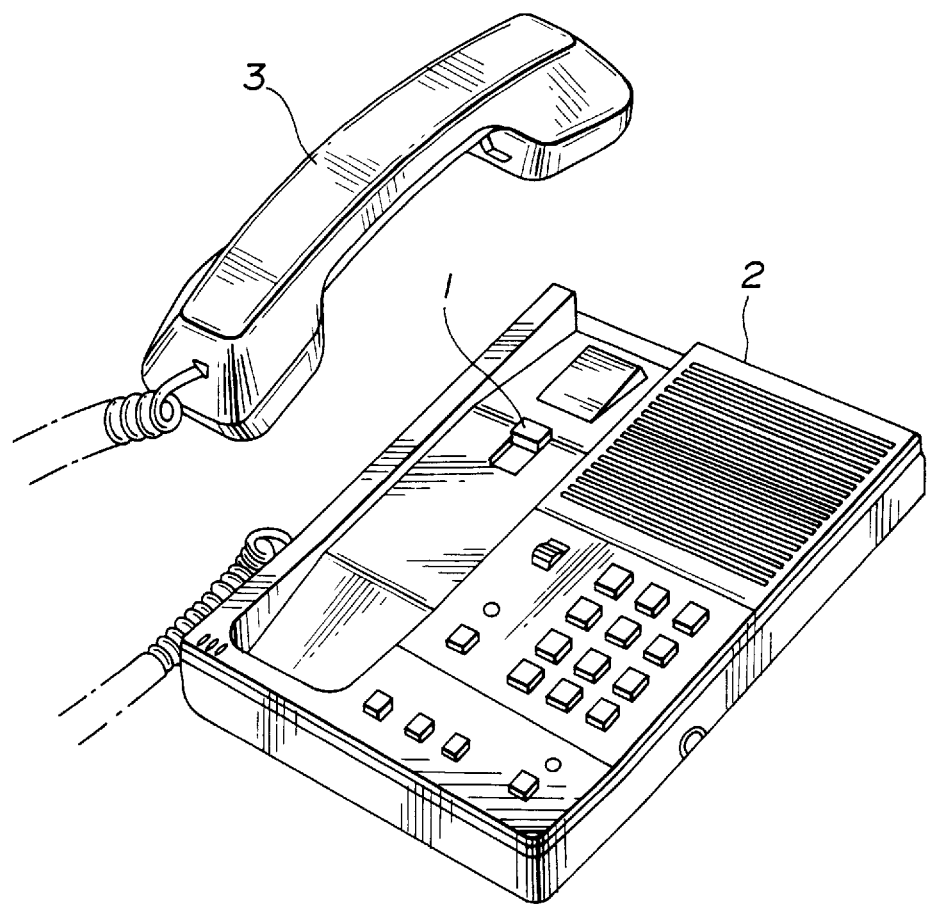
FIG. 4 shows the exterior of the telephone in Embodiment 1 of the present invention.

FIG. 1 illustrates the state when the telephone in Embodiment 1 of the present invention is set for wall-mount usage. FIG. 1 is an enlarged view of the portion where the receiver of the telephone shown in FIG. 4 is housed, for example. A hook 1 is provided to the concave component that receives the handset 3 of the telephone base 2. As shown in FIG. 1, when this hook 1 is protruding from the concave component, the hook 1 catches in the concave component (not shown) of the handset 3, so the handset 3 does not fall off when this telephone is mounted on the wall.

Figure 2:
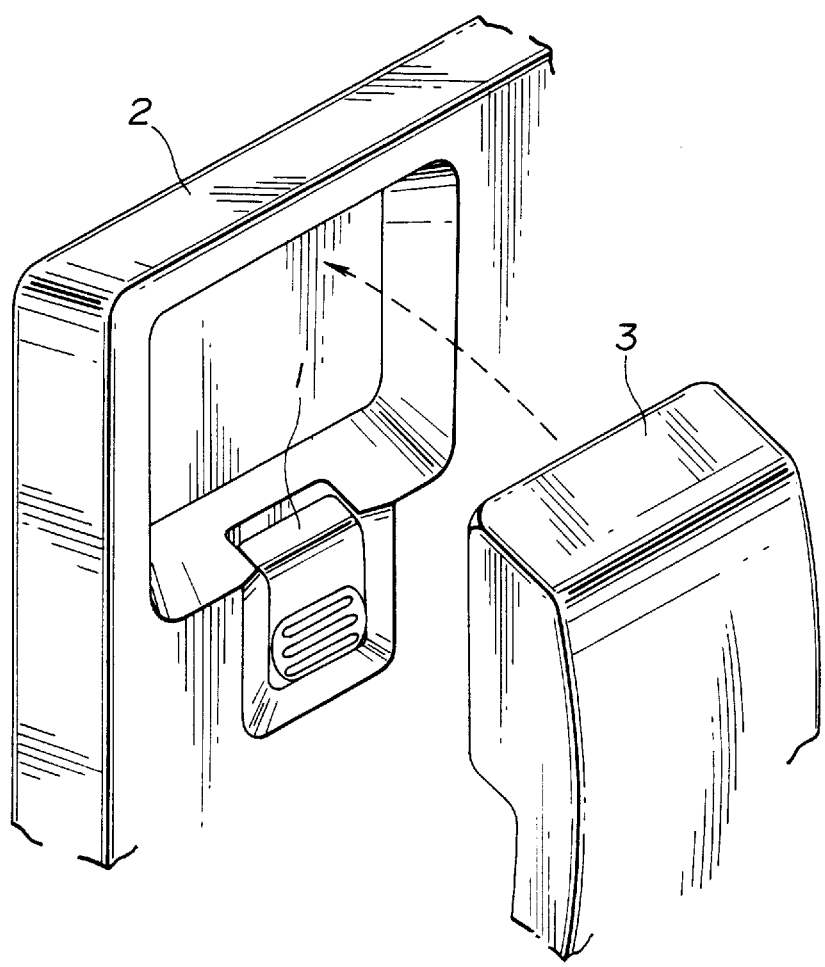
FIG. 2 illustrates the state when the telephone in Embodiment 1 of the present invention is set for tabletop usage.

FIG. 2 illustrates the state when the telephone in Embodiment 1 of the present invention is set for tabletop usage. When the telephone of FIG. 4 is used in a tabletop mode, the handset 3 is difficult to lift if the hook 1 is protruding as in FIG. 1. Therefore, the hook 1 is slid in the direction indicated by the arrow in FIG. 1. In FIG. 2, the hook 1 is not protruding.

Thus, the sliding of the hook 1 allows the telephone to be easily set for either wall-mount or tabletop usage. Furthermore, with Embodiment 1 of the present invention, the hook 1 is securely fixed, and will not slide accidentally. Therefore, when this telephone is mounted on the wall, the handset 3 will not come off unexpectedly. On the other hand, when the usage state is to be switched, the hook 1 can be easily slid by means of the specified operation. Therefore, the application of the telephone can be switched simply and effectively. The construction of this hook 1 will be discussed in detail below.

Figure 3:
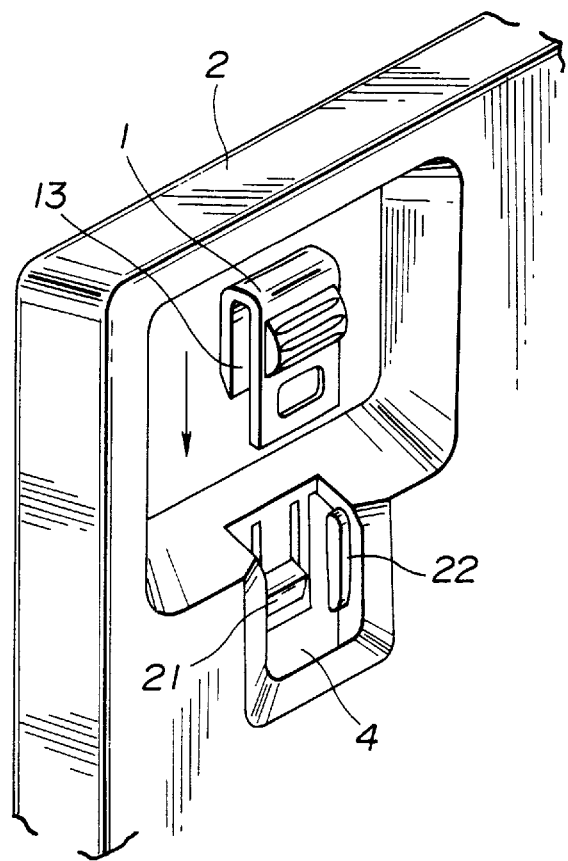
FIG. 3 illustrates the state when the hook 1 in Embodiment 1 of the present invention is inserted into the telephone.

FIG. 3 is a diagram that illustrates the installation of the hook 1. In the normal usage state, the hook 1 will not come out. FIG. 3 is intended to facilitate understanding of the structure of this hook 1 and of the telephone base 2 that receives this hook 1. In FIG. 3, the hook 1 is inserted in the direction of the arrow in the figure into the hook housing component 4 of the telephone base 2. The hook housing component 4 is provided with a hook retainer tab 21 and a rail component 22 over which the hook 1 is slid. The space 13 of the hook 1 fits over the rail component 22 with a specific amount of play. The hook retainer tab 21 serves to keep the hook 1 from coming out when the hook 1 is pressed upward.

Next, the structure of the hook 1 pertaining to Embodiment 1 of the present invention, and of the related portions thereof, will be described in detail through reference to the figures.

FIG. 5 shows the details of the hook 1. FIG. 5a is a front view of the hook 1, FIG. 5b is a left side view, FIG. 5c is a cross section along the 5c—5c line, FIG. 5d is a top view, FIG. 5e is a rear view, and FIG. 5f is a cross section along the 5f—5f line.

The hook 1 is roughly U-shaped. The hook 1 consists of a first portion 11 on the back side and a second portion 12 on the front side. A concave component 16 is provided to the first portion 11. The hook retainer tab 21 slides through this concave component 16. Specifically, the first portion 11 of the hook 1 is sandwiched between the hook retainer tab 21 and the lower portion of the rail component 22, and is able to slide. A through hole 15 is provided to the second portion 12. When the hook 1 is pressed down, a convex component 23 (discussed below) fits into the through hole 15, so the hook 1 is able to maintain this [depressed] state. The hook 1 is equipped with an operation component 14 on its front.

Figure 6:
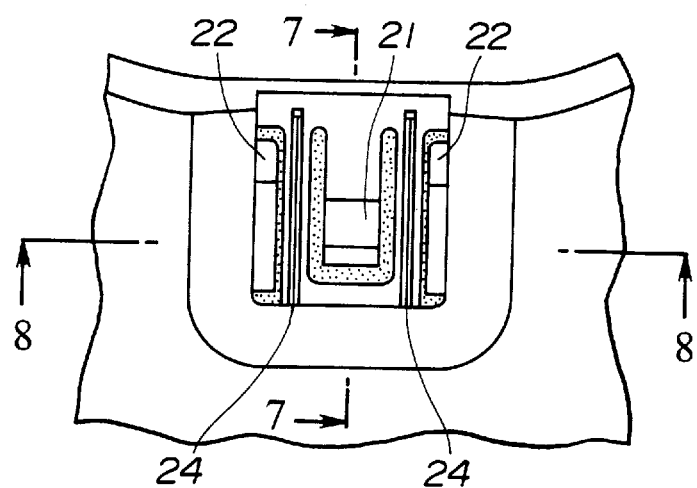
FIG. 6 is a detail front view of the hook housing component 4 in Embodiment 1 of the present invention.
Figure 7:
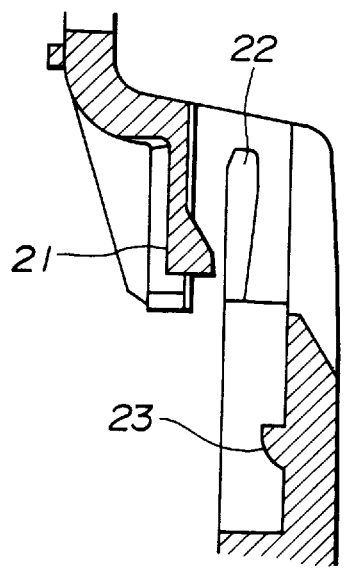
FIG. 7 is a cross section along the 7—7 line of the hook housing component 4 in Embodiment 1 of the present invention.
Figure 8:
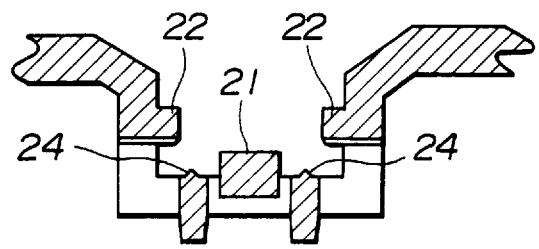
FIG. 8 is a cross section along the 8—8 line of the hook housing component 4 in Embodiment 1 of the present invention.

FIG. 6 is a detail front view of the hook housing component 4 in which the hook 1 is housed. FIG. 7 is a cross section along the 7—7 line in FIG. 6. FIG. 8 is a cross section along the 8—8 line in FIG. 6.

In FIGS. 6 through 8, the symbol 21 is a hook retainer tab, and the symbol 22 is a rail component. These are the same as those shown in FIG. 3. The symbol 23 is a convex component that engages with the through hole 15 of the hook 1. 24 is a small protrusion that comes into light contact with the back of the hook 1 and lowers the resistance when the hook 1 is slid.

The hook housing component 4 of the telephone base 2 and the above hook 1 are molded from a plastic material such as an ABS resin. The U-shaped hook 1, the hook retainer tab 21, and so on have a specific elasticity.

Next, FIGS. 9 through 12 will be used to describe the effect of the hook 1 and related portions.

Figure 9:
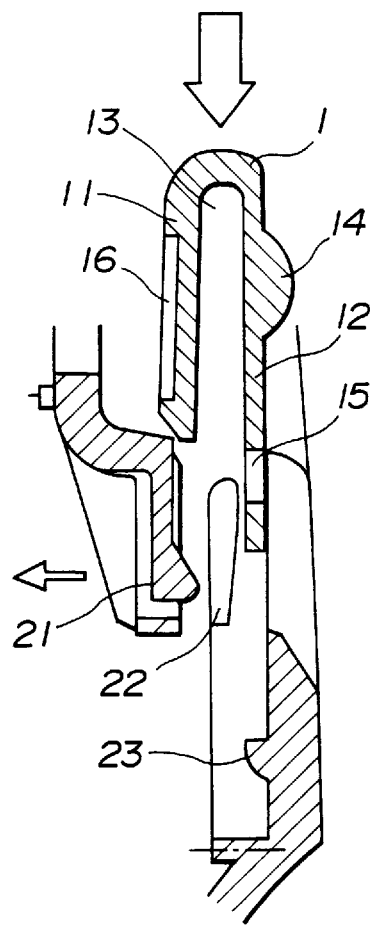
FIG. 9 is a cross section that illustrates the insertion of the hook in Embodiment 1 of the present invention.

FIG. 9 is a cross section corresponding to FIG. 3, and illustrates the insertion of the hook 1 into the hook housing component 4. When the hook 1 is pressed in the direction indicated by the arrow in FIG. 9, the hook 1 slides along the rail component 22. The width of the hook 1, that is, the width between the first portion 11 and the second portion 12, should be a little greater than the width of the hook housing component 4. When the hook 1 is pressed, the width of the hook 1 decreases slightly as a result of elasticity, and the hook 1 is inserted into the hook housing component 4. At this point the first portion 11 is pressed slightly toward the hook retainer tab 21. At the same time, the second portion 12 is pressed slightly toward the convex component 23. If the hook 1 continues to be pressed in the direction of the arrow, the tip of the first portion 11 will hit the hook retainer tab 21. Since the hook retainer tab 21 has elasticity, it moves slightly in the direction of the arrow in FIG. 9 (to the left). The hook retainer tab 21 then snaps into place in the concave component 16. This keeps the hook 1 from coming loose.

Figure 10:
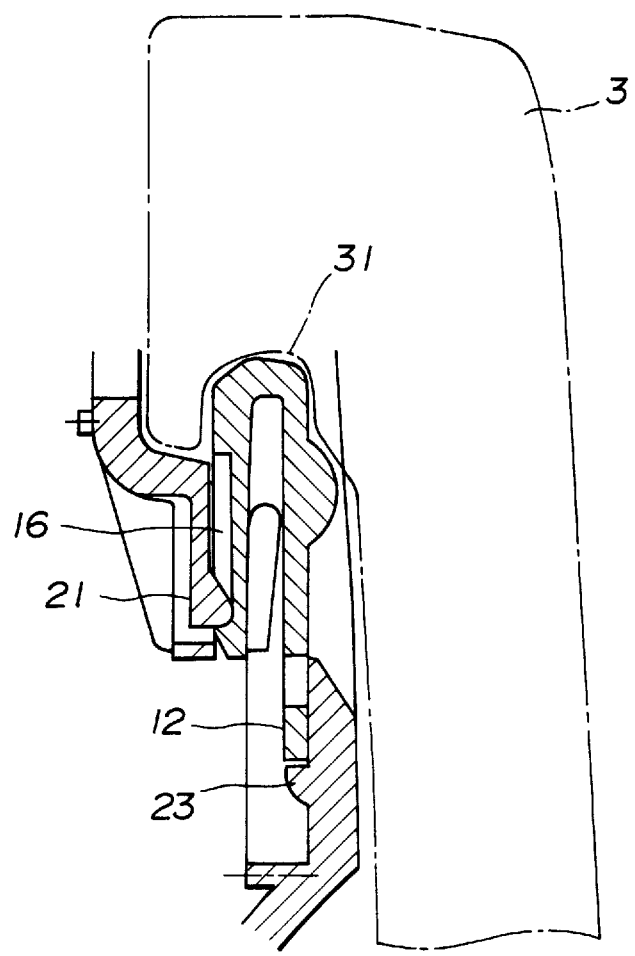
FIG. 10 is a cross section of the wall-mount usage state of the hook in Embodiment 1 of the present invention.

The state at this point is shown in FIG. 10. The concave component 16 of the hook 1 fits into the hook retainer tab 21, and the tip of the second portion 12 hits the convex component 23. Therefore, the state in FIG. 10 is a stable state in which the hook 1 moves neither up nor down. In this state in FIG. 10, that is, in the state in FIG. 1, when the telephone is mounted on the wall, the concave component 31 of the handset 3 will catch on the hook 1, and the handset 3 will not fall off. Because the hook 1 is in a stable state, as mentioned above, even if a force is applied in the direction in which the hook 1 is pressed down, the hook 1 will not slide on its own. Therefore, with Embodiment 1 of the present invention, the handset 3 will not fall off when the telephone is mounted on the wall.

Figure 11:
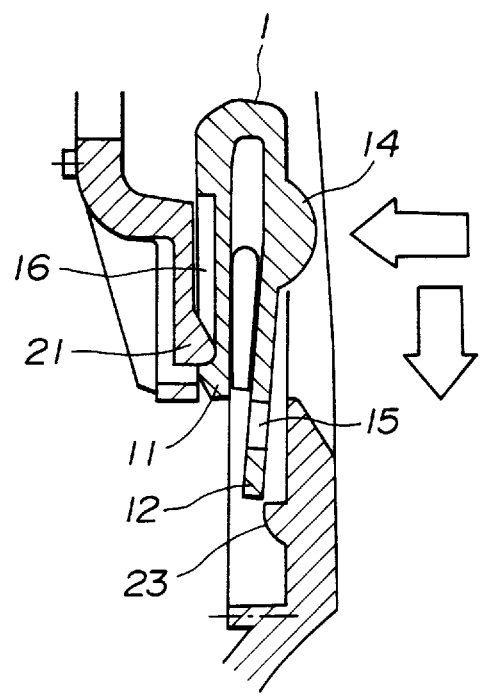
FIG. 11 is a cross section that illustrates the switch of the hook from a wall-mount usage state to a tabletop usage state in Embodiment 1 of the present invention.

With Embodiment 1 of the present invention, the hook 1 can be set to a tabletop usage state by a simple operation. This will be described through the use of FIG. 11. In FIG. 11, when the operation component 14 of the hook 1 is pressed to the left, the elasticity of the second portion 12 of the hook 1 causes it to bend slightly to the left. Since this results in the tip of the 12 moving away from the convex component 23, the hook 1 is able to slide freely. Therefore, when the operation component 14 is pressed in the downward direction, the hook 1 slides down, resulting in the state shown in FIG. 12. In this state, the convex component 23 fits into the through hole 15 of the second portion 12. Thus, a simple operation in which the operation component 14 is pressed and slid allows the hook 1 to be set to a tabletop usage state. Also, since the hook 1 must be pressed in and slid, rather than just being slid, the hook 1 will not be slid inadvertently.

Figure 12:
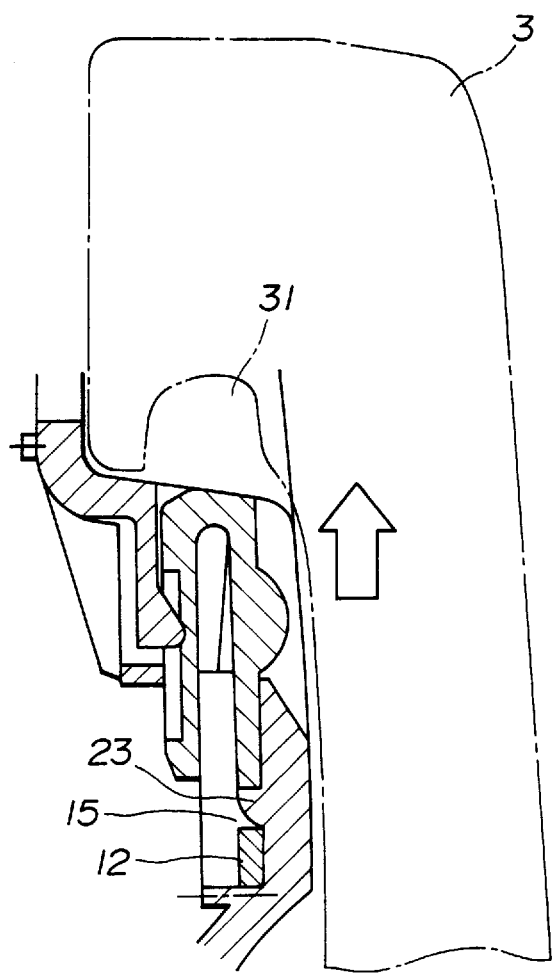
FIG. 12 is a cross section of the tabletop usage state of the hook in Embodiment 1 of the present invention.

The state in FIG. 12 is a tabletop usage state. In this state, the handset 3 can be picked up without catching on the hook 1. To change from the state in FIG. 12 to the state in FIG. 10, the operation component 14 is pushed upward. As a result, the tip of the second portion 12 moves while it is raised slightly by the convex component 23, resulting in the state in FIG. 10. At this point the hook retainer tab 21 fits into the concave component 16 in the first portion 11, and the movement of the hook 1 is restricted in the pulling direction thereof, so the hook 1 will not come out. The reason why there is no particular need for pressing in the operation component 14 when the state in FIG. 12 is changed to the state in FIG. 10 is that one side of the convex component 23 (the lower side in the figure) scribes a smooth curve, and the second portion 12 rides up naturally over the convex component 23 on this side. The purpose of this structure is to facilitate the sliding operation. Since the hook 1 receives the weight of the handset 3, if there is no locking mechanism whatsoever the hook 1 is apt to change from the state in FIG. 10 to the state in FIG. 12. In order to prevent this, the other side of the convex component 23 (the upper side in the figure) is squared off, so the locking mechanism composed of the convex component 23 and the through hole 15 is not released unless the operation component 14 is pressed. Meanwhile, this is not a concern when the state in FIG. 12 is changed to the state in FIG. 10, so the structure in the figures is employed for the sake of easier operation. Nevertheless, both sides of the convex component 23 may be squared off so that the locking mechanism must be released regardless of the direction of the sliding.

As is clear from the above description, with Embodiment 1 of the present invention, the hook 1 can be reliably moved by a simple operation, and a telephone can be switched from a tabletop usage state to a wall-mount usage state with a one-touch operation. Moreover, there is no worry that this state will be changed accidentally. Also, since the hook 1 is constructed such that it does not readily come out, the user will not lose the hook. With prior art, a plurality of hooks were provided for replacement, or the hook was taken out and flipped over, so the hook was easy to lose.

Fewer parts also means a simpler structure. A simple assembly is advantageous in terms of the manufacturing process, and inspection is also easier.

Also, it is extremely easy to lift the hook 1 since one side of the convex component 23 is a curved surface. And since the other side is squared off, the hook 1 will not be pushed back into the housing accidentally.

Since the hook 1 is molded from a material that is elastic, and since the cross section thereof is U-shaped, the hook 1 is in contact with the inner surface of the hook housing component 4 at a suitable pressure. Therefore, the hook 1 slides smoothly without rattling, so it has excellent operatability. Also, since the contact surface area is small between the small protrusions 24 and the first portion of the hook 1, there is little contact resistance and operation is superior.

The optimal structure of Embodiment 1 of the present invention was described above, but the present invention is not limited to this. Variation examples will now be described.

The cross section of the hook 1 was U-shaped, but other shapes are also possible. One side may be equipped with the concave component 16 that meshes with the hook retainer tab 21, and the other side may be equipped with a concave component (through hole 15) that meshes with the convex component 23. Therefore, the hook 1 may not be equipped with the space 13, and may have a rectangular or trapezoidal cross section.

Also, the through hole 15 and concave component 16 of the hook 1 may have a convex shape, and the corresponding hook retainer tab 21 and convex component 23 may instead have a concave shape. The relationship of concave and convex may also be some other combination. In other words, there should be a first locking mechanism (the through hole 15 and the convex component 23) that maintains the two states of the hook 1, and a second locking mechanism (the concave component 16 and the hook retainer tab 21) that retains the hook 1. The first locking mechanism and the second locking mechanism may be provided to both sides as in the figures, or they may be provided to the same side. Alternatively, one may be provided to the back and one to the side.

When the hook 1 is structured such that it can be freely inserted and removed, there is no need for a second locking mechanism. In this case the hook 1 can also have a flat configuration.

What is claimed is:

1. A communications device equipped with a wall-mount hook mechanism said wall-mount hook mechanism comprising:

a hook member including:
        a first surface and a second surface,
        a first engagement component formed on said first surface, a second engagement component formed on said second surface, and an operating component disposed on said second surface; and a support mechanism including:

a third engagement component for engaging said first engagement component, and a fourth engagement component for engaging said second engagement component, said support mechanism being configured to support said hook member in both a protruding state and a non-protruding state, said hook member being configured for engaging a concave component provided on a handset of the communications device when said hook member is in said protruding state; wherein:

movement of said hook member is restricted by engagement of said first engagement component with said third engagement component and by contact between an end of said second surface with said fourth engagement component when said hook member is in said protruding state, and movement of said hook member is restricted by engagement of said second engagement component with said fourth engagement component when said hook member is in said non-protruding state, and application of a force on said operating component by a hand of a user eliminates the restriction to movement of said hook member while in said protruding state and said non-protruding state.

2. A communications device according to claim 1, wherein said support mechanism further comprises a rail component over which the hook member is made to slide.

3. A communications device according to claim 2, wherein said rail component is equipped with small protrusions that come lightly into contact with said hook member so that there is little resistance when said hook member slides.

4. A communications device according to claim 1, wherein said hook member has the operation component that appears on the second surface, and the contact between said second engagement component and said fourth engagement component is eliminated when said operation component is pressed down, and the restriction of the movement of said hook member is released.

5. A communications device according to claim 1, wherein said hook member is flexible, and a tip of said second engagement component is separated from said fourth engagement component when said second engagement component is pressed, thereby allowing said hook member to slide.

6. A communication device according to claim 1, wherein said hook member includes a U-shaped cross-section, said hook member is made from an elastic material, and said hook member comes into contact with inner surface of said support mechanism at a suitable pressure.

7. A communications device according to claim 1, wherein said first engagement component of said hook member is a concave component, said second engagement component of said hook member is a through hole, said third engagement component of said support mechanism is a hook retainer tab that slides over the concave component of said first engagement component, and said fourth engagement component of the support mechanism is a convex component that fits into the through hole of said second engagement component.

8. A communications device according to claim 7, wherein one end of the convex component of said fourth engagement component is formed linearly such that the non-protruding state will be maintained when the hook member changes from the protruding state to the non-protruding state, and the other end of the convex component of said fourth engagement component is formed in a smooth curve such that a change in state will be facilitated when said hook member is changed from the non-protruding state to the protruding state.

9. A communications device according to claim 7, wherein in the protruding state, said hook member is designed such that the tip of said second component hits against the convex component of said fourth engagement component so that said hook member will not move toward the inside of said support mechanism.

10. A communications device according to claim 7, wherein in the protruding state, the hook retainer tab of said third engagement component is in contact with one end of the concave component of said first engagement component so that said hook member will not come out of said support mechanism.

* * * * *